US012763713B2

(12) United States Patent
Wu

(10) Patent No.: US 12,763,713 B2
(45) Date of Patent: Oct. 13, 2026

(54) ELECTRIC-TOOL-TORQUE CONTROL SYSTEM AND FORCE-MULTIPLIER STRUCTURE

(71) Applicant: SHI SHING TECHNOLOGY CO., LTD., Taichung City (TW)

(72) Inventor: Yi-Min Wu, Taichung City (TW)

(73) Assignee: SHI SHING TECHNOLOGY CO., LTD., Taichung City (TW)

( * ) Notice: Subject to any disclaimer, the term of this patent is extended or adjusted under 35 U.S.C. 154(b) by 215 days.

(21) Appl. No.: 18/731,127

(22) Filed: May 31, 2024

(65) Prior Publication Data

US 2025/0373186 A1 Dec. 4, 2025

(51) Int. Cl.
*H02P 23/14* (2006.01)
*H02K 7/116* (2006.01)

(52) U.S. Cl.
CPC .............. *H02P 23/14* (2013.01); *H02K 7/116* (2013.01)

(58) Field of Classification Search
CPC .. H02P 23/14; H02P 21/20; H02P 5/69; H02P 5/695; H02P 6/08; H02P 6/04; H02K 7/116; H02K 7/145; B25B 21/00; B25B 23/14; B25B 17/02; B25B 21/008; B25B 23/147; B25B 21/002; B25B 21/02;
(Continued)

(56) References Cited

U.S. PATENT DOCUMENTS

2008/0098863 A1 5/2008 Kaneyama et al.
2012/0036970 A1* 2/2012 Chen ........................ B25B 23/14 81/479

(Continued)

FOREIGN PATENT DOCUMENTS

| | | |
|---|---|---|
| CN | 207077376 U | 3/2018 |
| TW | M397882 U | 2/2011 |
| TW | I495274 B | 8/2015 |

OTHER PUBLICATIONS

Office Action dated Sep. 27, 2024 of the corresponding Taiwan patent application No. 113107059.

(Continued)

*Primary Examiner* — Antony M Paul
(74) *Attorney, Agent, or Firm* — HDLS IPR SERVICES; Chun-Ming Shih

(57) ABSTRACT

An electric-tool-torque control system includes a torque tester, a force-multiplier structure, and an electric tool. The torque tester includes a detection shaft and a communication module. The force-multiplier structure includes a force-output end, a force-input end, a signal transmission unit, and a storage unit. The electric tool includes a force-output terminal, a control circuit, and a signal transmission module. The signal transmission module is electrically connected to the control circuit. The force-multiplier structure is assembled onto the torque tester. A test data is transmitted to the signal transmission unit through the communication module, and is transmitted from the signal transmission unit to the storage unit for storage. The signal transmission unit transmits the test data to the signal transmission module. The signal transmission module transmits the test data to the control circuit. The control circuit drives the force-multiplier structure to rotate based on the test data.

8 Claims, 9 Drawing Sheets

(58) Field of Classification Search
CPC ..... B25B 23/1475; G01L 25/003; G01L 3/00; B60K 6/547; B60W 2710/083; Y02T 10/84; B25F 5/001; B25F 5/00
See application file for complete search history.

(56) References Cited

U.S. PATENT DOCUMENTS

2016/0123832 A1 5/2016 Wu
2021/0132569 A1* 5/2021 Seith .................... G05B 19/401

OTHER PUBLICATIONS

Search report dated Oct. 18, 2024 of the corresponding EP patent application No. 24180158.8.

* cited by examiner

ELECTRIC-TOOL-TORQUE CONTROL SYSTEM AND FORCE-MULTIPLIER STRUCTURE

BACKGROUND OF THE DISCLOSURE

Technical Field

The present disclosure relates to a force multiplier, and especially relates to technical features that the force multiplier is detected to obtain a test data/torque value, and the test data/torque value is stored back into the force multiplier, to provide an electric tool with the test data/torque value, so that the electric tool drives the force multiplier to rotate based on the test data/torque value of the force multiplier.

Description of Related Art

The principle of the force multiplier is to generate a large output torque by inputting a smaller force through the difference of high-efficiency gear ratio.

Currently, the electric tool may set the output torque value. When the electric tool reaches the set torque value, the electric tool may idle or stop outputting. The maximum torque value of a certain electric tool is, for example, 300 Nm, but since the construction requires, for example, 500 Nm, a force multiplier is needed to increase the torque; in this case, a force multiplier of more than 500 Nm may be arranged. Taking the currently commercially available model MT2-1500 as a force multiplier with the torque ratio of 1:10, when the torque output range is 150 Nm~1500 Nm, inputting 150 Nm into the force multiplier may output 1500 Nm. Therefore, after a related art force multiplier is arranged, the related art force multiplier may transmit the data to the related art electric tool, and the related art electric tool may use the data to control the input torque value (0~150 Nm), so that the same related art electric tool may be used to obtain a torque output of 0~1500 Nm, and there is no need to change or buy higher-torque electric tools (for example, if a related art electric tool inputs 50 Nm torque into the related art force multiplier, the related art force multiplier outputs 500 Nm torque).

Moreover, every force multiplier may have an error value; namely, there is an error value as soon as the force multiplier is manufactured. For example, the above model MT2-1500 has an error value of ±6% (Direction & Accuracy: C.W.±6%). Moreover, the error value may be generated due to the long-term use as well. Therefore, a related art torque tester is required for testing, and the data is stored in the related art force multiplier. When the related art electric tool obtains the data, the related art electric tool may calculate the torque to make up (to add or to subtract) the error value to avoid locking objects too tight (which causes breakage or collapse) or too loose.

Therefore, how to solve the error caused by using the force multiplier every time is the problem to be solved by the present disclosure.

SUMMARY OF THE DISCLOSURE

Therefore, the main object of the present disclosure is to solve the traditional deficiencies. The present disclosure provides a brand-new electric tool control system and a force-multiplier structure. When the force-multiplier structure is used, a torque tester is used to detect the test data (the torque value) of the force-multiplier structure, and transmit the test data back to the internal of the force-multiplier structure for storage. Meanwhile, the force-multiplier structure also transmits the detected test data to the electric tool for reception, and then the electric tool drives the force-multiplier structure to rotate based on the test data obtained from the detection.

In order to achieve the above object, the present disclosure provides an electric-tool-torque control system which includes a torque tester, a force-multiplier structure, and an electric tool. The torque tester at least includes a detection shaft and a communication module. The force-multiplier structure includes a force-output end, a force-input end, a signal transmission unit, and a storage unit. The force-output end is exposed at one end of the force-multiplier structure. The force-input end is exposed at the other end of the force-multiplier structure. The signal transmission unit and the storage unit are arranged inside the force-multiplier structure. The storage unit is electrically connected to the signal transmission unit. The electric tool at least includes a force-output terminal, a control circuit, and a signal transmission module. The signal transmission module is electrically connected to the control circuit. Moreover, the one end of the force-multiplier structure is assembled onto/with the detection shaft. The torque tester detects the force-multiplier structure to obtain a test data. The test data detected in the force-multiplier structure is transmitted to the signal transmission unit through the communication module, and is transmitted from the signal transmission unit to the storage unit for storage, and then the signal transmission unit transmits the test data to the signal transmission module, and then the signal transmission module transmits the test data to the control circuit, and then the control circuit drives the force-multiplier structure to rotate based on the test data.

In an embodiment of the present disclosure, the communication module, the signal transmission unit, and the signal transmission module are conductive pins, connectors, or wireless transmission circuits.

In an embodiment of the present disclosure, the wireless transmission circuits are WIFI modules or Bluetooth modules.

In an embodiment of the present disclosure, the signal transmission unit of the force-multiplier structure stores the test data (which is calculated) in the storage unit.

In an embodiment of the present disclosure, the control circuit of the electric tool includes a data receiving module. After the electric tool is assembled with the force-multiplier structure, the signal transmission module transmits the test data to the control circuit, and the control circuit transmits the test data to the data receiving module after the test data is processed by the control circuit, and the control circuit drives the force-multiplier structure to rotate based on the test data received by the data receiving module.

In order to achieve the above object, the present disclosure provides a force-multiplier structure assembled with a torque tester and an electric tool. The force-multiplier structure includes a gear set, a force-output end, a force-input end, a signal transmission unit, and a storage unit. The gear set is arranged inside the force-multiplier structure. The force-output end is exposed at one end of the force-multiplier structure; the force-output end is geared and assembled with the gear set. The force-input end is exposed at the other end of the force-multiplier structure; the force-input end is geared and assembled with the gear set. The signal transmission unit is arranged inside the force-multiplier structure. The storage unit is arranged inside the force-multiplier structure and electrically connected to the signal transmission unit. Moreover, the signal transmission unit receives a test data which is detected and transmitted by the torque tester, and then the storage unit stores the test data.

In an embodiment of the present disclosure, the torque tester includes a torque testing circuit, a detection shaft, and a communication module. The torque testing circuit is electrically connected to the detection shaft and the communication module. The one end of the force-multiplier structure is assembled onto/with the detection shaft, so that the signal transmission unit is connected with the communication module.

In an embodiment of the present disclosure, the electric tool at least includes a force-output terminal, a control circuit, and a signal transmission module. The signal transmission module is electrically connected to the control circuit. The force-output terminal of the electric tool is assembled with the force-input end of the force-multiplier structure, so that the signal transmission unit is electrically connected to the signal transmission module.

In an embodiment of the present disclosure, the control circuit at least includes a data receiving module. After the signal transmission module receives the test data of the force-multiplier structure and processes the test data, the control circuit transmits the test data to the data receiving module, and the control circuit drives the force-multiplier structure to rotate based on the test data received by the data receiving module.

In an embodiment of the present disclosure, the communication module, the signal transmission unit, and the signal transmission module are conductive pins, connectors, or wireless transmission circuits.

DETAILED DESCRIPTION

Figure 1:
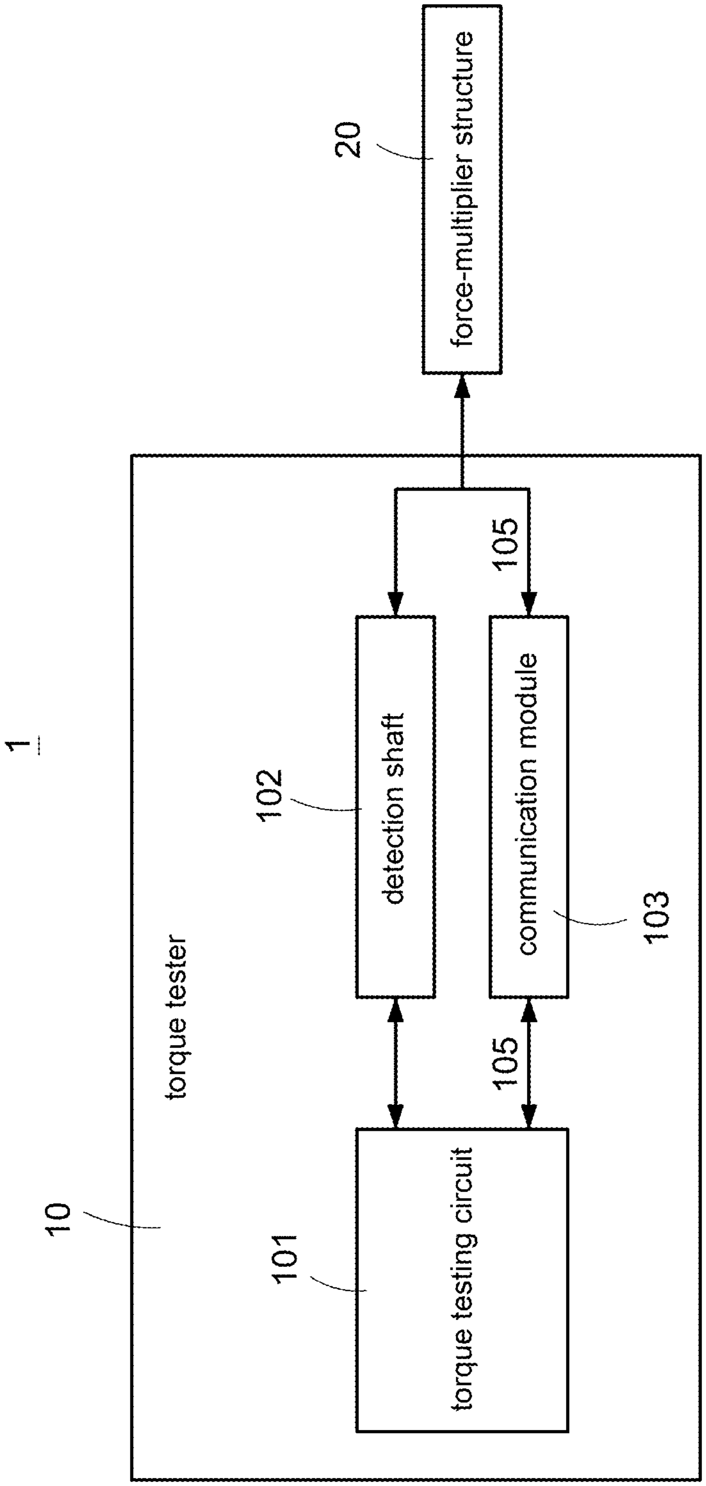
FIG. 1 shows a circuit block diagram of the torque tester of the electric-tool-torque control system of the present disclosure.
Figure 2:
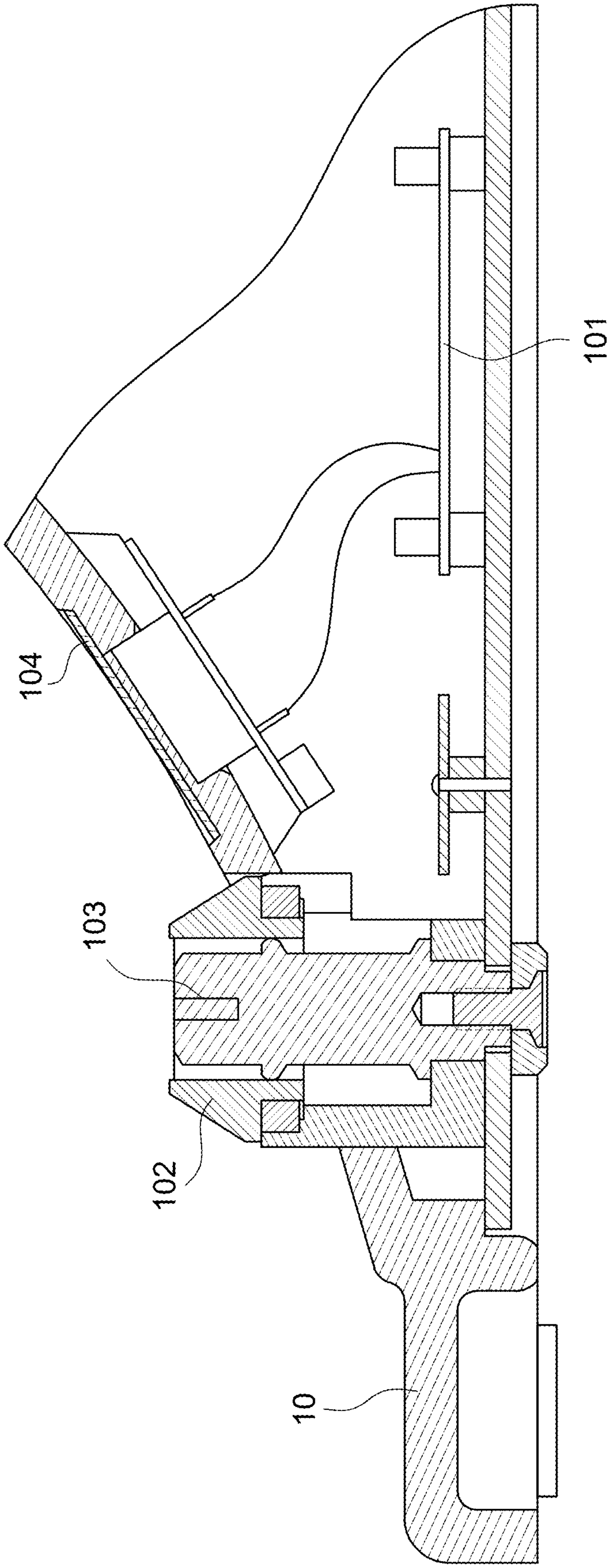
FIG. 2 shows a schematic side cross-sectional view of the torque tester of the present disclosure.
Figure 3:
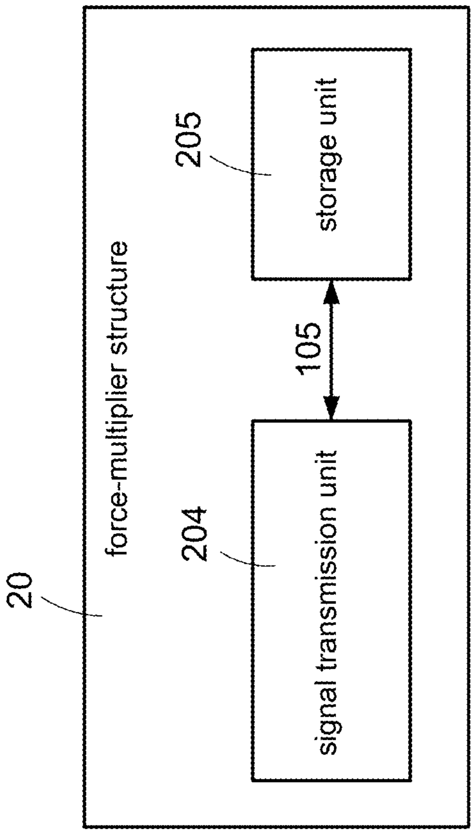
FIG. 3 shows a circuit block diagram of the force-multiplier structure of the present disclosure.

The technical contents and the detailed descriptions of the present disclosure are now described as follows with reference to the drawings:

FIG. 1 shows a circuit block diagram of a torque tester 10 of an electric-tool-torque control system 1 of the present disclosure. FIG. 2 shows a schematic side cross-sectional view of the torque tester 10 of the present disclosure. FIG. 3 shows a circuit block diagram of a force-multiplier structure 20 of the present disclosure. As shown in the figures, the electric-tool-torque control system 1 of the present disclosure at least includes a torque tester 10 and a force-multiplier structure 20.

The torque tester 10 is a related art torque tester configured to measure torque, and at least includes a torque testing circuit 101, a detection shaft 102, and a communication module 103.

Figure 4:
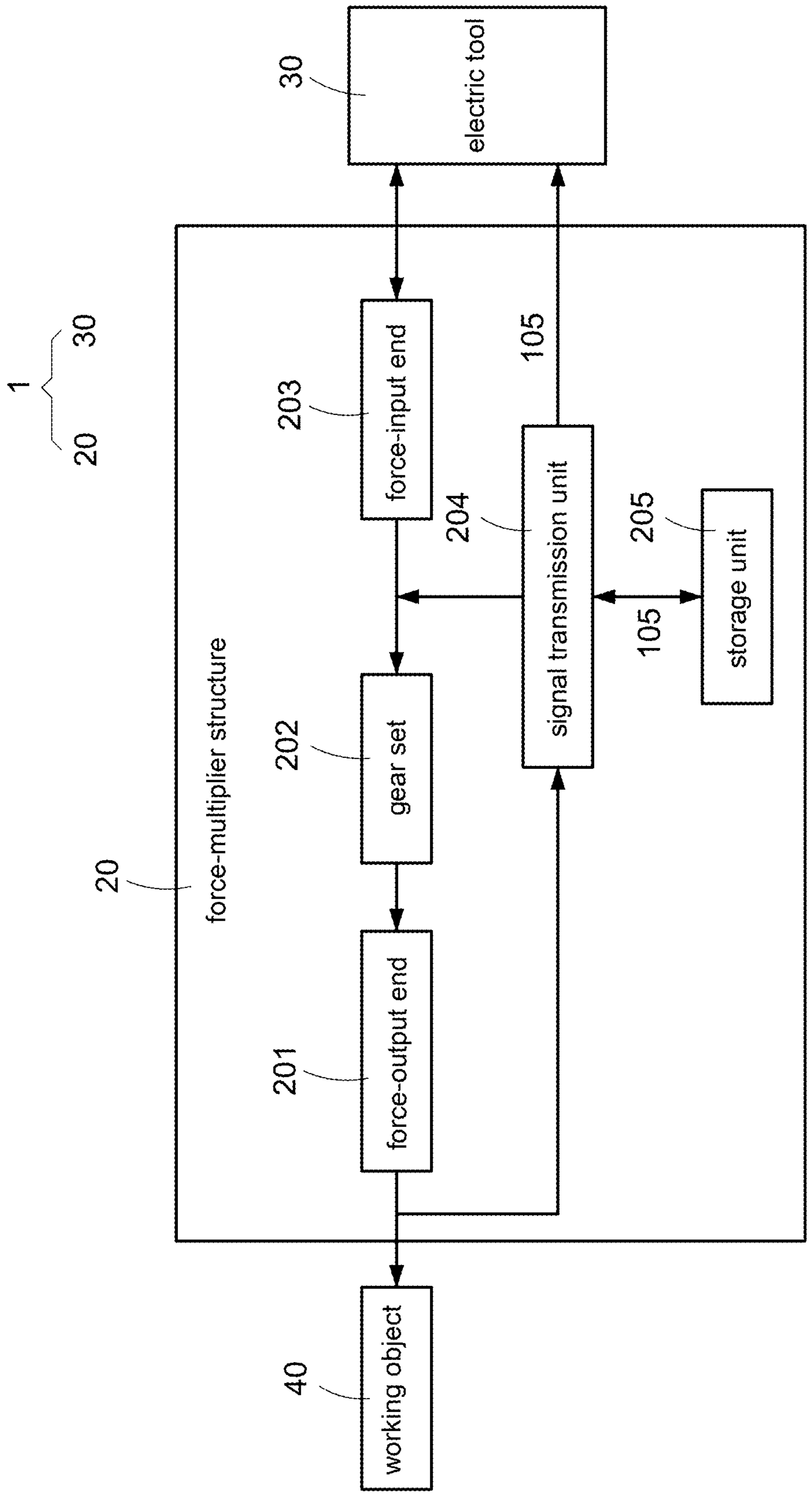
FIG. 4 shows a further circuit block diagram of the force-multiplier structure of the present disclosure, and shows a circuit block diagram of the force-multiplier structure which is electrically connected to the electric tool to drive the working object.

The detection shaft 102 is electrically connected to the torque testing circuit 101. The detection shaft 102 is exposed outside the torque tester 10 for assembly with a force-output end 201 (as shown in FIG. 4) of the force-multiplier structure 20. The detection shaft 102 receives a torque from the force-multiplier structure 20 so that the torque testing circuit 101 may detect the torque and obtain the test data 105.

The torque testing circuit 101 is used to calculate and obtain a test data 105 (Nm) which is generated when the detection shaft 102 is driven and rotated by the force-multiplier structure 20. The torque testing circuit 101 detects the torque transmitted through the detection shaft 102 and calculates the test data 105. The test data 105 is displayed on a display screen 104 of the torque tester 10.

The communication module 103 may be arranged inside the torque tester 10 and is electrically connected to the torque testing circuit 101. The communication module 103 may transmit the test data 105 (which is detected in the force-multiplier structure 20) to a signal transmission unit 204 of the force-multiplier structure 20 for reception, and then the signal transmission unit 204 transmits the test data 105 to a storage unit 205 for storage. Or the communication module 103 may be arranged inside the detection shaft 102 (as shown in FIG. 2). When the force-output end 201 (as shown in FIG. 4) of the force-multiplier structure 20 is assembled with the detection shaft 102, the communication module 103 is electrically or wirelessly connected to the signal transmission unit 204 which is arranged in the force-output end 201 of the force-multiplier structure 20. The test data 105 detected in the force-multiplier structure 20 is transmitted through the communication module 103 to the signal transmission unit 204, and is stored in the storage unit 205. In the figures, the communication module 103 is conductive pins, a connector, or a wireless transmission circuit. The wireless transmission circuit is a WIFI module or a Bluetooth module.

After the force-output end 201 of the force-multiplier structure 20 is assembled with the detection shaft 102, the other end of the force-multiplier structure 20 may be assembled with a hand tool, an electric tool, or a special manufacturing tool (a test tool that comes with the torque tester). When the force-multiplier structure 20 is driven to rotate by one of the hand tool, the electric tool, and the special manufacturing tool, the torque testing circuit 101 performs the detection to obtain the test data 105; the detection result is transmitted to the signal transmission unit 204 through the communication module 103, and is stored in the storage unit 205 inside the force-multiplier structure 20.

It is worth mentioning that the above-mentioned assembly method assembles the force-output end 201 of the force-multiplier structure 20 with an external sleeve (not shown in the figures), and then the external sleeve (inter-hexagonal nut) is sleeved on the detection shaft 102.

Figure 5:
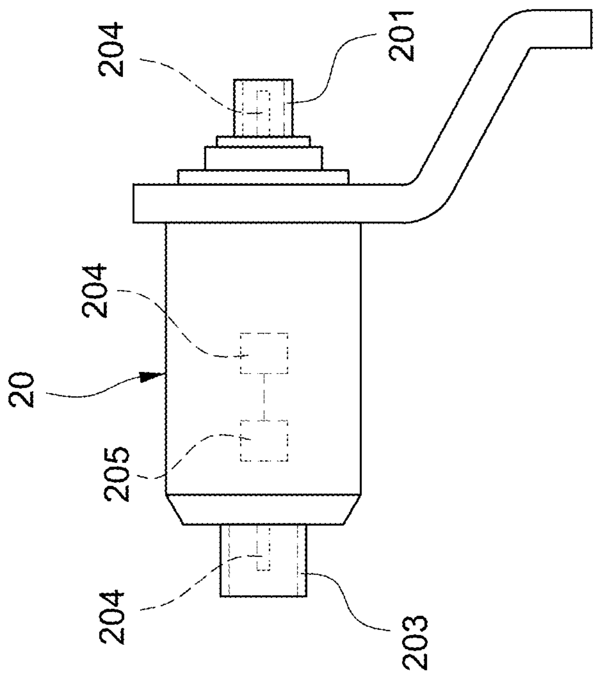
FIG. 5 shows an appearance diagram of the force-multiplier structure of the present disclosure.
Figure 6:
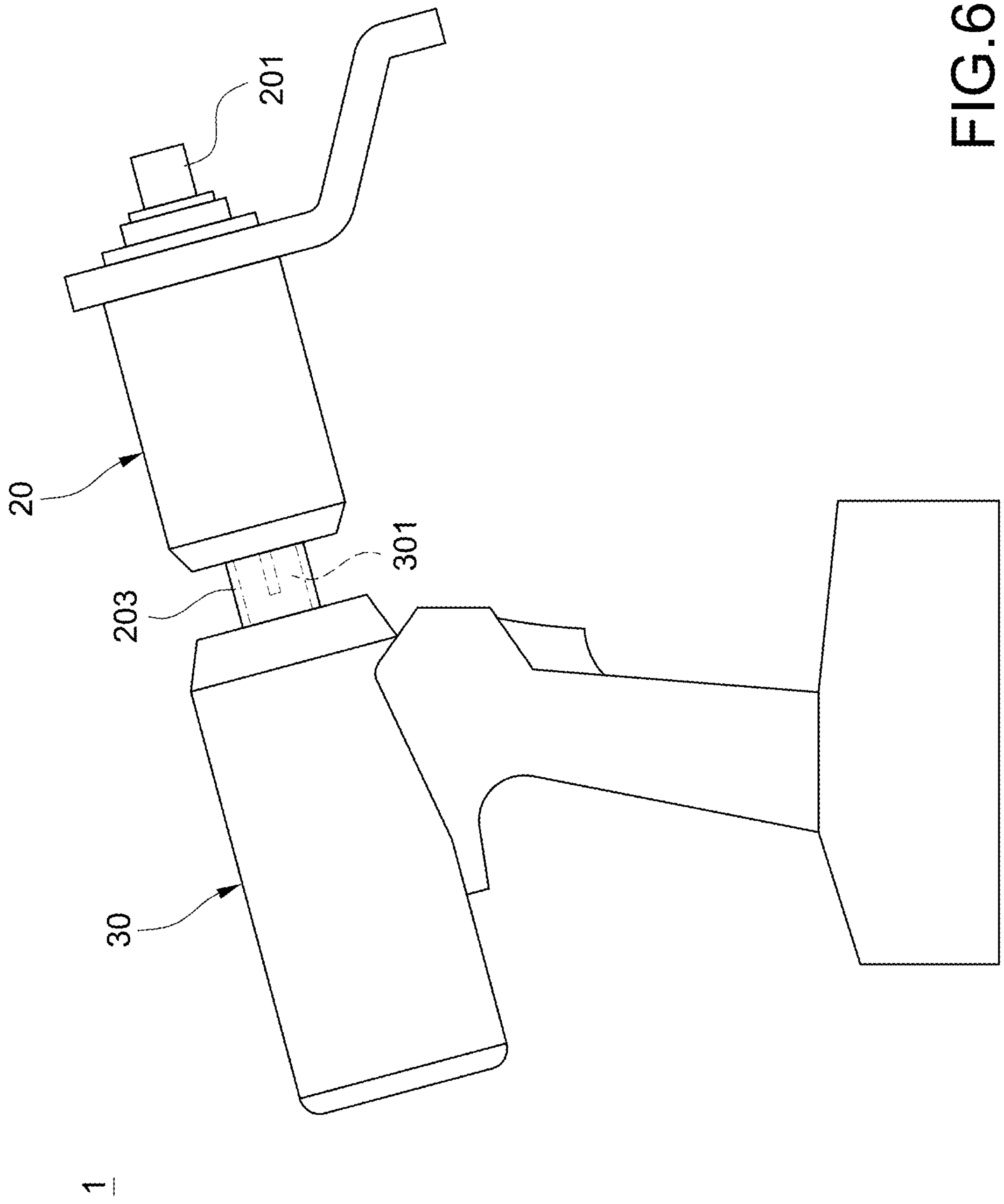
FIG. 6 shows a schematic diagram of the assembly of the force-multiplier structure and the electric tool of the present disclosure.

FIG. 4 shows a further circuit block diagram of the force-multiplier structure 20 of the present disclosure, and shows a circuit block diagram of the force-multiplier structure 20 which is electrically connected to an electric tool 30 to drive a working object 40. FIG. 5 shows an appearance diagram of the force-multiplier structure 20 of the present disclosure. FIG. 6 shows a schematic diagram of the assembly of the force-multiplier structure 20 and the electric tool 30 of the present disclosure. Also refer to FIG. 1 to FIG. 3. The force-multiplier structure 20 of the present disclosure further includes a force-output end 201, a gear set 202, a force-input end 203, a signal transmission unit 204, and a storage unit 205.

The force-output end 201 is exposed at one end of the force-multiplier structure 20 and is a polygonal shaft portion, which is assembled with the gear set 202. The force-output end 201 is driven by the gear set 202.

The gear set 202 is arranged inside the force-multiplier structure 20 and is assembled with the force-output end 201 and the force-input end 203. The gear set 202 is a related art gear set and is not described in detail here.

The force-input end 203 is exposed at the other end of the force-multiplier structure 20 and is a polygonal groove, which is assembled with the gear set 202. After the force-input end 203 is assembled with a force-output terminal (not shown in the figures) of the electric tool 30, the force-input end 203 is driven by the electric tool 30 to drive the gear set 202 to rotate, thereby driving the force-output end 201 to generate the torque output. The signal transmission unit 204 is arranged inside the force-multiplier structure 20 and is electrically connected to the storage unit 205. After the signal transmission unit 204 receives the test data 105 transmitted by the communication module 103, the signal transmission unit 204 stores the test data 105 into the storage unit 205.

The storage unit 205 is electrically connected to the signal transmission unit 204, and is used to store the test data 105 detected in the force-multiplier structure 20. In the figures, the storage unit 205 is a memory; the signal transmission unit 204 is conductive pins, a connector, or a wireless transmission circuit. The wireless transmission circuit is a WIFI module or a Bluetooth module.

Figure 8:
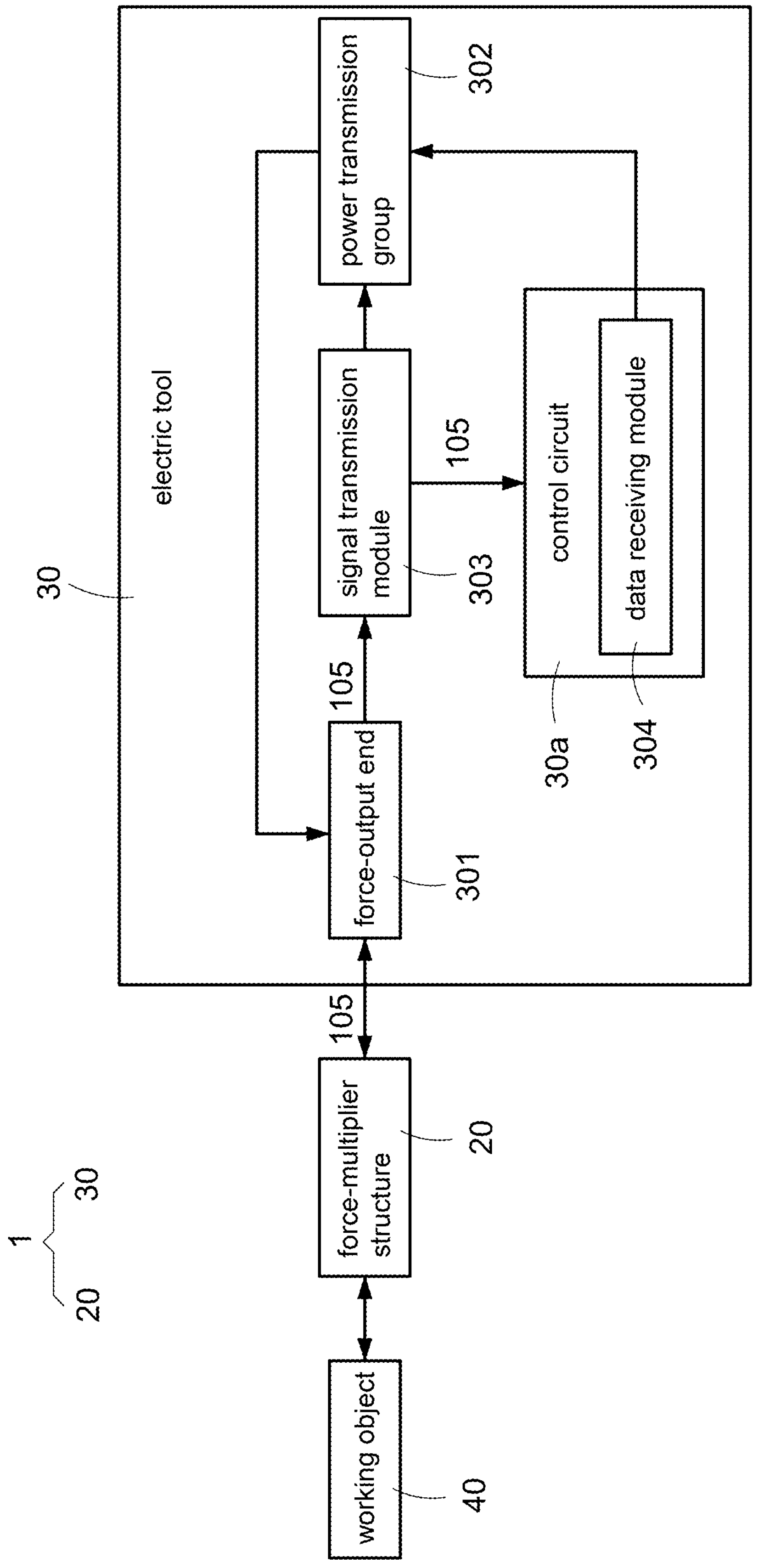
FIG. 8 shows a further circuit block diagram of the electric tool of the present disclosure.

During operation, the torque testing circuit 101 detects the force-multiplier structure 20 through the detection shaft 102 to obtain the test data 105. The detection result (the test data 105) is transmitted to the signal transmission unit 204 through the communication module 103 and stored in the storage unit 205 inside the force-multiplier structure 20. When the force-multiplier structure 20 is assembled with the electric tool 30, the test data 105 inside the storage unit 205 is transmitted to a signal transmission module 303 (as shown in FIG. 8) of the electric tool 30 through the signal transmission unit 204, and then is transmitted from the signal transmission module 303 to the data receiving module 304 (as shown in FIG. 8) for reception. A control circuit 30*a* (as shown in FIG. 8) of the electric tool 30 drives the force-multiplier structure 20 to rotate based on the test data 105, so that the working object 40 may be constructed.

Further, please refer to FIG. 5 and FIG. 6. The signal transmission unit 204 in the force-multiplier structure 20 of the present disclosure may be arranged on/in the force-output end 201 and the force-input end 203 respectively. When the force-output end 201 is assembled with the detection shaft 102 of the torque tester 10 (as shown in FIG. 2) to perform the detection for the test data 105, the signal transmission unit 204 is electrically connected to the communication module 103 in the detection shaft 102, and the torque tester 10 transmits the test data 105 to the force-multiplier structure 20 for reception. When the force-input end 203 is assembled with a force-output terminal 301 of the electric tool 30, the signal transmission unit 204 is electrically connected to the signal transmission module 303 (see FIG. 9) arranged in the force-output terminal 301 of the electric tool 30, so that the force-multiplier structure 20 may transmit the test data 105 to the electric tool 30 for reception, so that the electric tool 30 may drive the force-multiplier structure 20 to rotate based on the test data 105.

Figure 7:
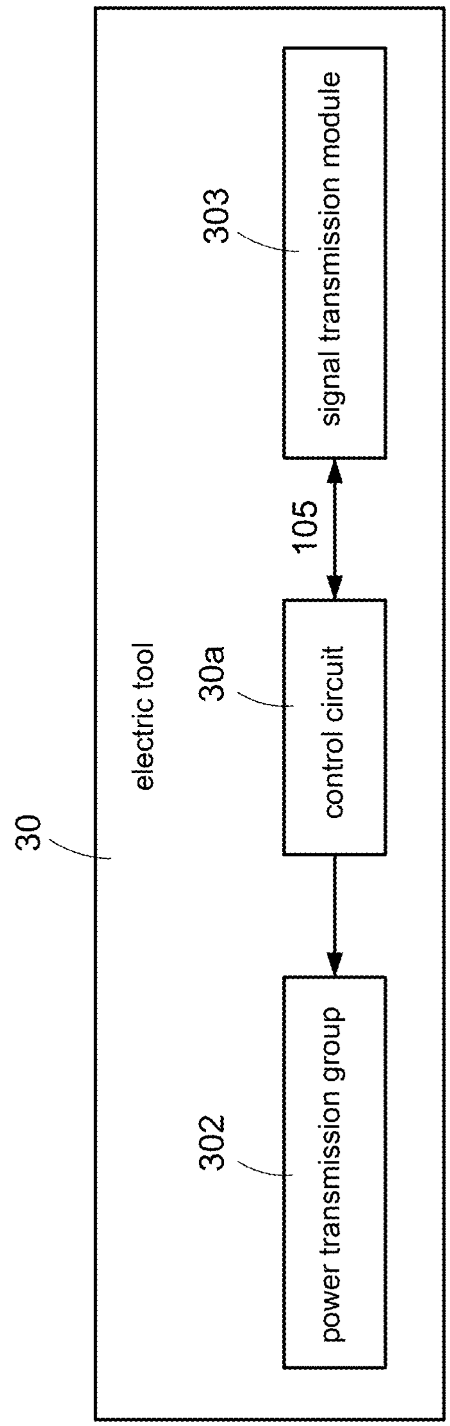
FIG. 7 shows a circuit block diagram of the electric tool of the present disclosure.
Figure 9:
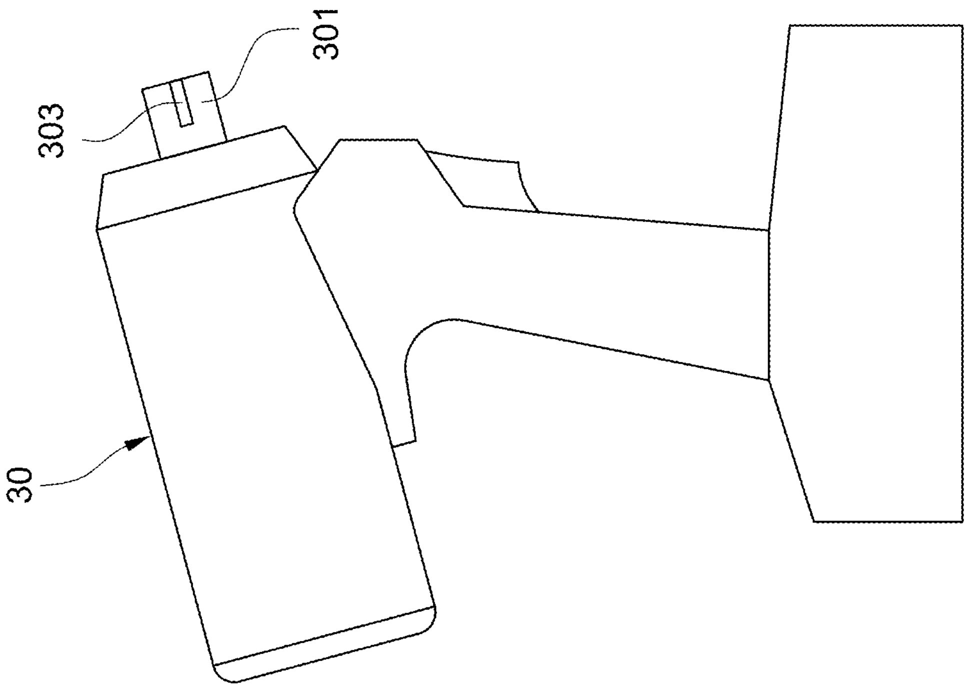
FIG. 9 shows an appearance diagram of the electric tool of the present disclosure.

FIG. 7 shows a circuit block diagram of the electric tool 30 of the present disclosure. FIG. 8 shows a further circuit block diagram of the electric tool 30 of the present disclosure. FIG. 9 shows an appearance diagram of the electric tool 30 of the present disclosure. Also refer to FIG. 1 to FIG. 6. As shown in the figures, the electric tool 30 of the present disclosure includes a force-output terminal 301, a power transmission group 302, a signal transmission module 303, and a control circuit 30*a*.

The force-output terminal 301 is exposed at one end of the electric tool 30 and is assembled with the power transmission group 302. After the power transmission group 302 is driven by the control circuit 30*a* inside the electric tool 30, the power transmission group 302 drives the force-output terminal 301 to rotate. The signal transmission module 303 is arranged inside the electric tool 30 and is electrically connected to the control circuit 30*a* to drive the power transmission group 302 based on the signal of the test data 105 detected in the force-multiplier structure 20 to drive the force-output terminal 301 to rotate. In the figures, the signal transmission module 303 is conductive pins, a connector, or a wireless transmission circuit. The wireless transmission circuit is a WIFI module or a Bluetooth module.

The control circuit 30*a* is electrically connected to the signal transmission module 303. The control circuit 30*a* at least includes a data receiving module 304. The signal transmission module 303 receives the signal of the test data 105 detected in the force-multiplier structure 20. The control circuit 30*a* calculates the test data 105 (adding or subtracting the error value) and transmits the test data 105 which is calculated to the data receiving module 304 for storage. The control circuit 30*a* inside the electric tool 30 drives the power transmission group 302 based on the test data 105, so that the power transmission group 302 drives the force-output terminal 301 for power output.

During operation, the force-input end 203 of the force-multiplier structure 20 is assembled with the force-output terminal 301 of the electric tool 30, and the test data 105 inside the storage unit 205 of the force-multiplier structure 20 is transmitted through the signal transmission unit 204 to the signal transmission module 303 for reception, and then the signal transmission module 303 transmits the test data 105 to the data reception module 304 for reception. The control circuit 30*a* of the electric tool 30 drives the force-multiplier structure 20 to rotate based on the test data 105, so that the working object 40 may be constructed.

For example, the test data 105 of the electric tool 30 is 240 Nm, but the test data 105 required for work is 300 Nm, which has exceeded the load of the electric tool 30, so the force-multiplier structure 20 must be arranged. When the test data 105 of the multiplier structure 20 detected by the torque tester 10 is 500 Nm, it may be used for work of 300 Nm. However, since each force-multiplier structure 20 has an error value, or has a larger error value after being used for a long time, the detected test data 105 (Nm) must be transmitted to the electric tool 30; after the electric tool 30 receives the signal of the test data 105, the control circuit 30*a* inside the electric tool 30 may calculates the test data 105 (adding or subtracting the error value), and then the power (driving force) may be outputted to drive the force-multiplier structure 20 to work on the working object 40.

Further, please refer to FIG. 9. The signal transmission module 303 of the present disclosure may be arranged in the force-output terminal 301. When the force-input end 203 (as shown in FIG. 6) of the force-multiplier structure 20 is assembled with the force-output terminal 301 of the electric tool 30, the signal transmission module 303 is electrically connected to the signal transmission unit 204. The force-multiplier structure 20 may transmit the detected test data 105 to the electric tool 30; after the test data 105 is processed by the control circuit 30*a*, the control circuit 30*a* transmits the test data 105 to the data receiving module 304. The control circuit 30*a* inside the electric tool 30 drives the force-multiplier structure 20 to rotate based on the test data 105 received by the data receiving module 304. However, the above descriptions are only embodiments of the present disclosure and are not intended to limit the scope of the patent protection of the present disclosure. Therefore, all equivalent changes made by using the contents of the descriptions or drawings of the present disclosure are similarly included in the scope of the patent protection of the present disclosure and are hereby stated.

What is claimed is:

1. An electric-tool-torque control system comprising:

a force-multiplier structure comprising a force-output end, a force-input end, a signal transmission unit, and a storage unit, wherein the force-output end is exposed at one end of the force-multiplier structure, and the force-input end is exposed at the other end of the force-multiplier structure, and the signal transmission unit and the storage unit are arranged inside the force-multiplier structure, and the storage unit is electrically connected to the signal transmission unit;

a torque tester for measuring a torque of the force-multiplier structure, comprising a detection shaft to receive the torque from the force-multiplier structure and a communication module; and an electric tool at least comprising a force-output terminal, a control circuit, and a signal transmission module, wherein the signal transmission module is electrically connected to the control circuit, wherein the one end of the force-multiplier structure is assembled onto the detection shaft; a test data detected in the force-multiplier structure is transmitted to the signal transmission unit through the communication module, and is transmitted from the signal transmission unit to the storage unit for storage; the signal transmission unit transmits the test data to the signal transmission module; the signal transmission module transmits the test data to the control circuit; the control circuit drives the force-multiplier structure to rotate based on the test data.

2. The electric-tool-torque control system of claim 1, wherein the communication module, the signal transmission unit, and the signal transmission module are conductive pins, connectors, or wireless transmission circuits.

3. The electric-tool-torque control system of claim 2, wherein the wireless transmission circuits are wifi modules or bluetooth modules.

4. The electric-tool-torque control system of claim 1, wherein the signal transmission unit of the force-multiplier structure stores the test data which is calculated in the storage unit.

5. The electric-tool-torque control system of claim 1, wherein the control circuit of the electric tool comprises a data receiving module; after the electric tool is assembled with the force-multiplier structure, the signal transmission module transmits the test data to the control circuit, and the control circuit transmits the test data to the data receiving module after the test data is processed by the control circuit, and the control circuit drives the force-multiplier structure to rotate based on the test data received by the data receiving module.

6. A force-multiplier structure assembled with a torque tester and an electric tool, wherein the torque tester is configured to measure a torque of the force-multiplier structure, the force-multiplier structure comprising:

a gear set arranged inside the force-multiplier structure;

a force-output end exposed at one end of the force-multiplier structure and geared and assembled with the gear set;

a force-input end exposed at the other end of the force-multiplier structure and geared and assembled with the gear set;

a signal transmission unit arranged inside the force-multiplier structure; and a storage unit arranged inside the force-multiplier structure and electrically connected to the signal transmission unit, wherein the signal transmission unit receives a test data which is detected and transmitted by the torque tester; the storage unit stores the test data, wherein the torque tester comprises a torque testing circuit, a detection shaft, and a communication module; the detection shaft receives the torque from the force-multiplier structure, and the torque testing circuit detects the torque transmitted through the detection shaft and calculates the test data; the torque testing circuit is electrically connected to the detection shaft and the communication module; the one end of the force-multiplier structure is assembled onto the detection shaft, so that the signal transmission unit is connected with the communication module;

wherein the electric tool at least comprises a force-output terminal, a control circuit, and a signal transmission module; the signal transmission module is electrically connected to the control circuit; the force-output terminal of the electric tool is assembled with the force-input end of the force-multiplier structure, so that the signal transmission unit is electrically connected to the signal transmission module.

7. The force-multiplier structure of claim 6, wherein the control circuit at least comprises a data receiving module; after the signal transmission module receives the test data of the force-multiplier structure and processes the test data, the control circuit transmits the test data to the data receiving module; the control circuit drives the force-multiplier structure to rotate based on the test data received by the data receiving module.

8. The force-multiplier structure of claim 7, wherein the communication module, the signal transmission unit, and the signal transmission module are conductive pins, connectors, or wireless transmission circuits.

* * * * *